Feb. 7, 1967   C. A. B. CLEMETSON   3,302,636
BAROSTATIC SKIN CAPILLARY FRAGILITY TESTING APPARATUS
Filed Oct. 23, 1963
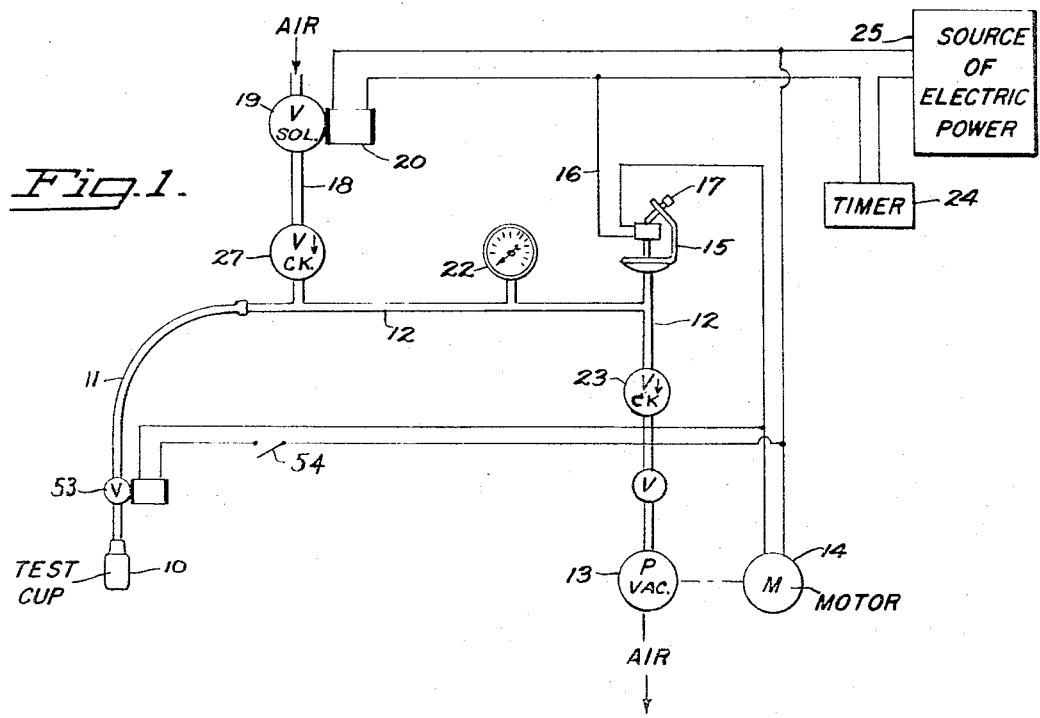
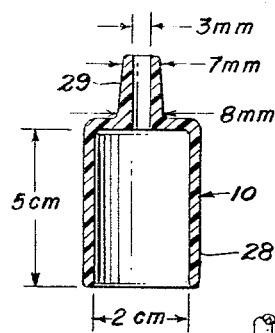
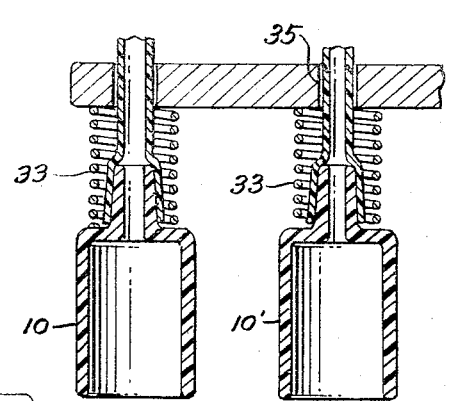
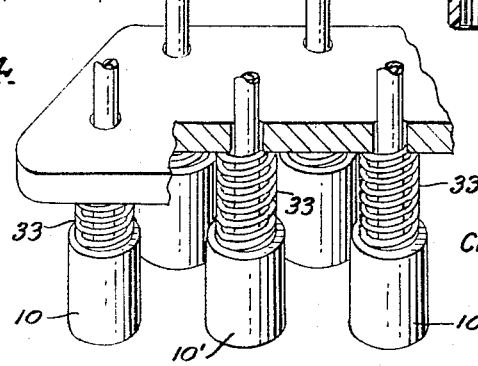
INVENTOR.
CHARLES ALAN B. CLEMETSON
BY
Owen, Wickersham & Erickson
ATTORNEYS

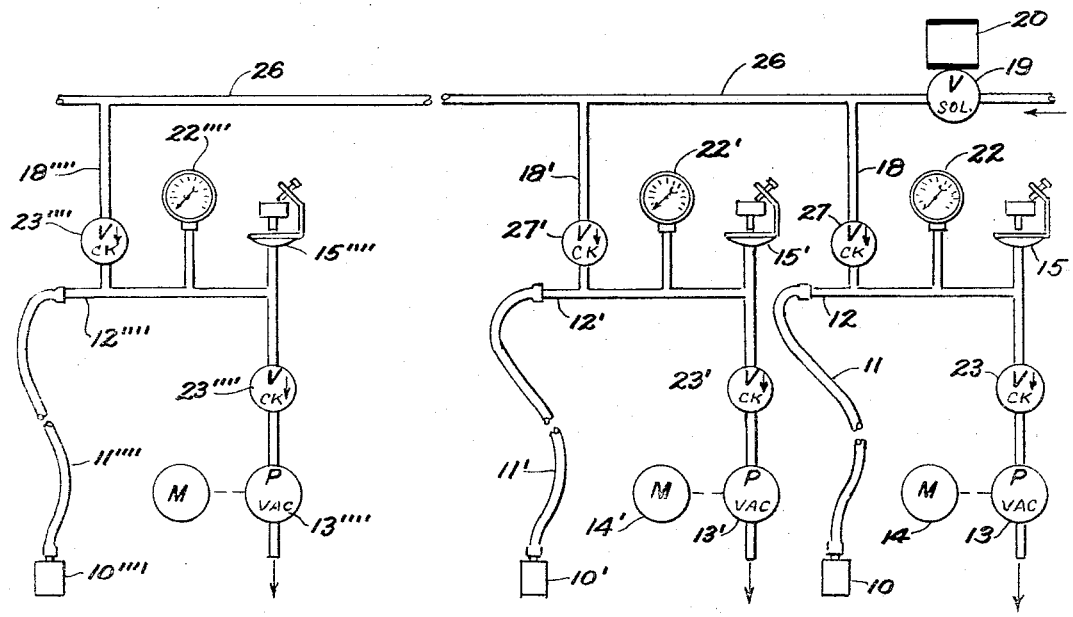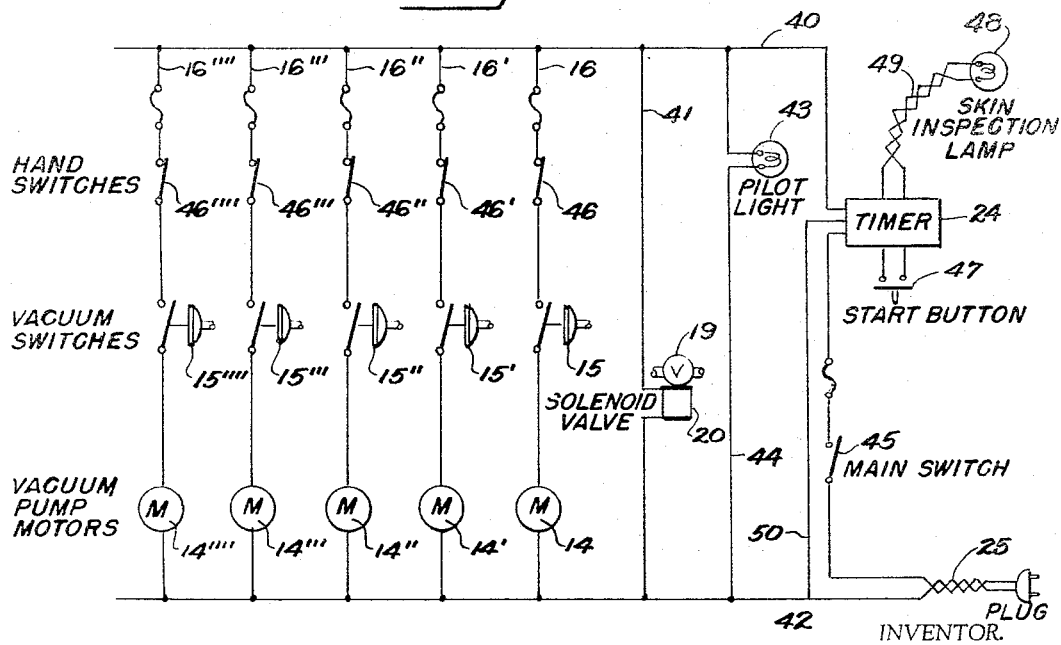

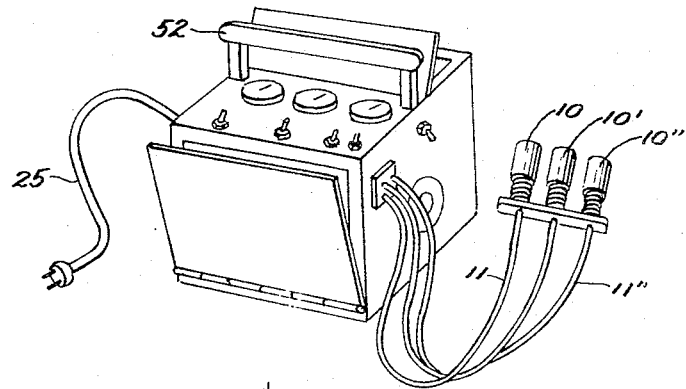
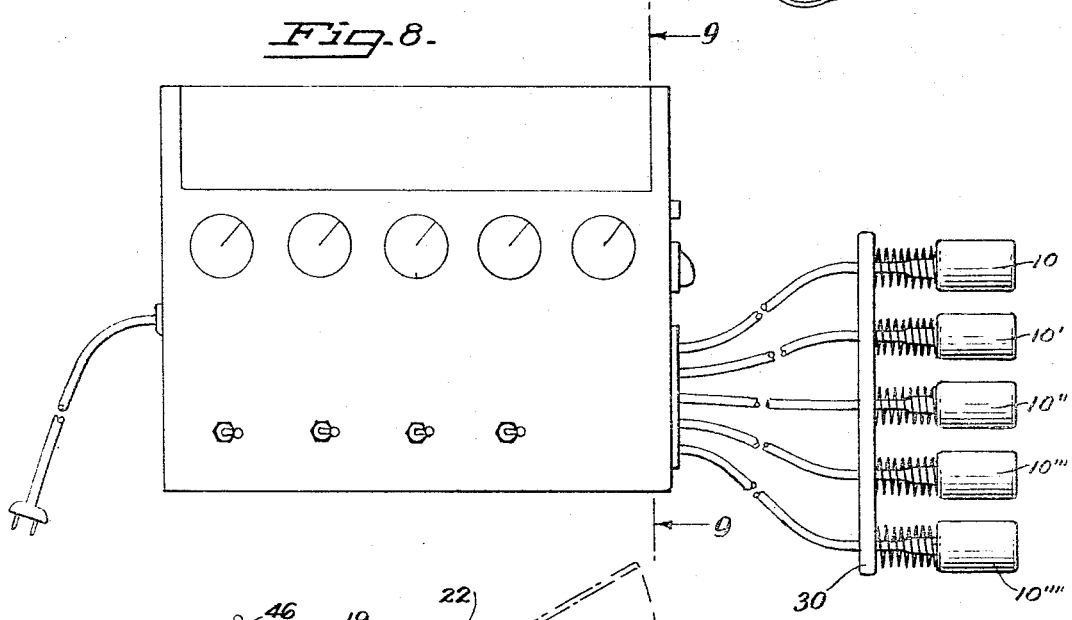
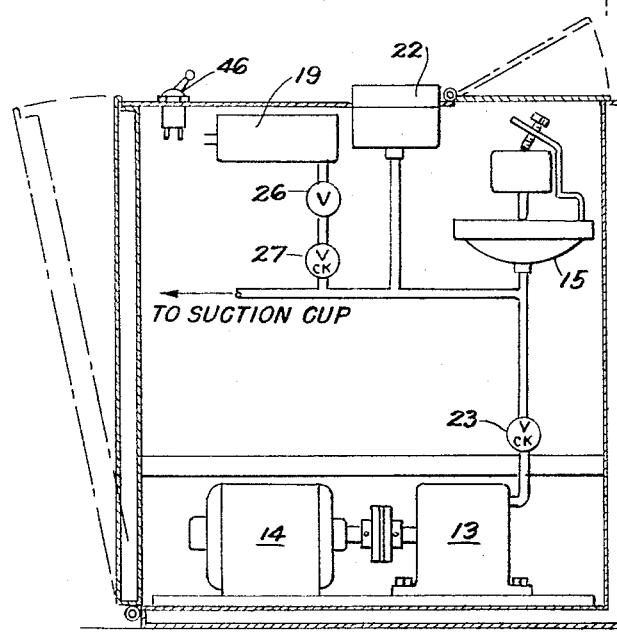

3,302,636
BAROSTATIC SKIN CAPILLARY FRAGILITY
           TESTING APPARATUS
Charles Alan B. Clemetson, San Francisco, Calif., assignor to The Regents of the University of California, Berkeley, Calif.
         Filed Oct. 23, 1963, Ser. No. 318,390
                  13 Claims. (Cl. 128—2)

This invention relates to the clinical measurement of the resistance to rupture of the small blood vessels of human skin, and, more particularly, it relates to means for artificially producing petechiae under accurately controlled conditions.

It has for a primary object the measurement of the capillary strength of human subjects with a maximum of accuracy, convenience, time-saving and reproducibility.

Other objects will become apparent from the following description.

It is well known that the small blood vessels located close to the skin, particularly at or near their extremities, have a tendency to rupture and "leak" when the skin is subjected to reduced external pressure, the amount of reduced pressure to produce the occurrence varying with the person and with the physical condition of the person involved. Since weakness of these blood vessels may be caused by any one of several abnormal conditions, the resistance of these blood vessels to rupture (variously referred to as "capillary fragility," "capillary resistance" and "capillary strength," though it is recognized that the small arterioles and venules may be involved as well as the capillaries) is becoming recognized as an important sign by diagnosticians and researchers, particularly in the field of gynecology.

While "capillary strength" may be measured either by the positive-pressure cuff methods or by the negative-pressure suction cup methods, only the latter method can be applied daily to the same subject, as to a patient during treatment. By the suction cup method, the capillary strength of a subject is found by applying a predetermined reduced pressure to the skin surface in a defined area of the body for a specified time and then, by visual inspection, determining the presence or absence of tiny hemorrhages (petechiae) and their number in the given area. Certain hand-operated instruments have been developed for the purpose of such measurement.

In one such instrument, a suction cup having a defined opening for contact with the skin (2 cm. diameter in a specific case) is connected to a hand-operated plunger type suction pump and to a small vacuum gage. With this instrument the operator can "pump up" a vacuum of any desired amount, up to perhaps 60 cm. Hg (i.e. positive pressures down to about 16 cm. Hg), within the suction cup when applied to the skin surface. This instrument has a number of disadvantages to the diagnostician interested in accurate, reproducible and rapid determinations. First, the vacuum gage, being necessarily small, is subject to errors of reading and lack of stability. Second, the nature of the apparatus requires a substantial period of "pumping" to reach the desired degree of vacuum, thus affecting the accuracy and reproducibility of the time factor of each test. Third, repeated tests at different degrees of vacuum must be conducted to determine the critical pressure for each patient.

Another available instrument has a suction cup (2 cm. diameter opening) rigidly connected to a cylinder containing a spring-operated variable-stroke calibrated piston. With this instrument the time to reach a desired vacuum is essentially instantaneous, but the vacuum obtained is dependent upon the strength of a coiled spring. Moreover, with this instrument large undetected errors can occur in the vacuum actually obtained if the seal between the suction cup and the skin is not absolutely tight or if there is a leak elsewhere in the instrument. The actual pressure obtained with a spring-type instrument is largely dependent on how far the skin is sucked up into the cap; hence the actual pressure may differ considerably from the supposed pressure. Another disadvantage of an instrument of this type is that the single-stroke piston arrangement necessarily limits the vacuum obtainable to a maximum of about 30 cm. Hg (or about 46 cm. minimum positive pressure). With this instrument, it is likewise necessary to make several tests at varying degrees of vacuum to obtain the critical value for the subject in each case.

In addition to the foregoing disadvantages, these manually operated instruments require that the operator give strict attention to the timing of each test. If a stop watch or other timer is used, it requires manual starting at a time when the operator's hands and attention are fairly well occupied with other tasks essential to the proper start of the test. If the operator prefers to time the test by observing the sweep second hand of a clock, the chance of error is large if there is any distraction whatsoever during a test. False starts are not only time-consuming but are annoying to a patient, even to the extent of responding abnormally to the test. Subject-attitude is particularly important in research testing of volunteer subjects.

The present invention avoids the aforementioned disadvantages of present capillary-strength testing methods and instruments by providing means for automatically establishing a preselected vacuum in the test cup, both rapidly and uniformly, and automatically releasing the vacuum at a preselected time. Since the operator's attention can be concentrated entirely on the patient and the proper positioning of the test cup, all other operations being automatic, the invention lends itself to the making of plural simultaneous tests on a subject. Thus, certain species of the invention contemplate a series of tests being made simultaneously at adjacent areas of skin under different, predetermined vacuum settings, thereby substantially reducing the time required for determining the critical vacuum value for the production of petechiae.

The invention will be more readily understood by reference to the drawings, wherein:

FIG. 1 is a schematic piping and wiring diagram of a single-unit apparatus embodying the principles of the invention;

FIG. 2 illustrates, in vertical section, a form of test cup having a standard 2 cm. test opening, adapted for use in the invention;

FIG. 3 is a fragmentary view in elevation and in section, illustrating part of a battery of test cups in accordance with a species of the invention;

FIG. 4 is a fragmentary perspective view on a reduced scale, partly in section, of a battery of five test cups in accordance with species of the invention;

FIG. 5 is a schematic piping diagram of a multiple unit with the units uniquely combined to provide for simultaneous plural tests in accordance with a species of the invention;

FIG. 6 is a schematic wiring diagram for a multiple unit device having a battery of five test units in accordance with a species of the invention, and suitable for the control of the apparatus depicted in FIG. 5;

FIG. 7 is a view in perspective of an instrument case adapted to contain a battery of three test units according to a species of the invention;

FIG. 8 is a plan view of an intsrument housing adapted to contain a battery of five test units arranged in accordance with a species of the invention; and FIG. 9 is a view in section taken along the line 9—9 of FIG. 8, showing a preferred arrangement of principal elements within a housing, such as those of FIGS. 7 and 8.

Referring to FIG. 1, the invention in its simplest form comprises a test cup 10 connected by flexible tubing 11 and a piping system or line 12 to a vacuum pump 13 impelled by an electric motor 14. Connected to the line 12 is a vacuum switch 15 adapted to open an electric circuit 16 at a predetermined vacuum corresponding to the setting of an adjustment screw 17. Also connected to the pipe 12, by a pipe 18, is a vacuum release valve, such as a solenoid valve 19 adapted to open the pipe 18 and the pipe 12 to the atmosphere when no current is flowing through its coil 20 and to close off the pipe 18 when its coil 20 is energized. Advantageously, a vacuum gage 22 may also be connected to the pipe 12. A check valve 23 is provided between the line 12 and the vacuum pump 13 to maintain vacuum in the system 12 when the pump 13 is stationary. A needle valve 21 provides an adjustable constriction between the pump 13 and the check valve 23, to prevent over-shooting of the vacuum. A timer 24 capable of holding an electric circuit closed for at least one minute with an accuracy of about one second is provided and wired, as shown, to a source 25 of electric power in such manner that, during the "on" period of the timer 24, current is supplied to the coil 20 of the solenoid valve 19 and, through the vacuum switch 15 (when closed) to the motor 14. To permit the simultaneous use of a plurality of similar apparatus as contemplated by more specific forms of the invention, a valved manifold connection 26 and a check valve 27 may be provided in the line 18. Line switches, timer starting button, fuses, pilot lights, and similar well-known conveniences may be added to the circuit as desired.

A suitable form for the test cup 10 is illustrated in FIG. 2, and comprises a hollow cylinder 28 which is open at one end and at the other end is integral with a tubular tip 29 of tapering dimensions suitable for connection to the flexible tubing 11 (FIG. 1), as by insertion into the end thereof. The diameter of the cylinder 28 is such as to provide, at its open end, a test area of the desired size. With a test area opening 2 cm. in diameter, which is commonly employed in capillary strength testing apparatus, the various dimensions shown in FIG. 2 have been found convenient. I prefer to mold the entire cup 10 as a unit from transparent thermoplastic cast acrylic plastic, though obviously it may be molded, machined, or otherwise fashioned from any suitable material, and its shape and dimensions may be varied as desired. Preferably, the cup 10 should be of material that does not feel cold to the skin.

The motor 14 and pump 13 may be of the miniature oil-less type, capable of creating a 50 cm. Hg suction for short intervals.

In employing the apparatus of FIG. 1 to test the capillary strength of a subject, the adjusting screw 17 is set to correspond to a desired degree of vacuum and the timer 24 is set for the desired time interval, which is preferably one minute. The cup 10 is then placed in close contact with the subject's skin, there being no need to use grease in order to ensure sealing, and the timer 24 is started. Current from the timer 24 energizes the solenoid valve 19 closing the system 12 off from the atmosphere, and also activates the motor 14, causing the pump 13 to evacuate the system 12 rapidly until the preset degree of vacuum is attained, whereupon the switch 15 shuts off the motor 14, stopping the pump 13. The check valve 23 then prevents air from entering the system 12 through the then-inactive pump 13. When the timer 24 reaches the end of its preset timing cycle (e.g., one minute), it opens the circuit to the valve 19 (and to the switch 15), and the valve 19 opens, allowing air to release the vacuum in the system. If, during the test, the vacuum in the system 12 should drop because of a leak anywhere in the system, the switch 15 will close, re-activating the motor 14 and the pump 13 to restore the desired vacuum immediately.

It is thus seen that, by use of the invention, a capillary strength determination may be made substantially automatically, permitting the operator to devote his entire attention to the subject with full confidence that the vacuum intensity and time will be accurate.

Additional determinations at other vacuum settings may be made by resetting the screw 17 of the switch 15 and repeating the foregoing operations. However, the invention contemplates, in its more specific aspects, the use of several similar test apparatus units combined in a novel manner, whereby a series of tests at different degrees of vacuum may be made simultaneously, thereby saving time and inconvenience to both operator and subject.

To this end, a plurality of test cups is employed, such as the cups 10, 10', 10'', 10''' and 10'''' illustrated in FIG. 5, and these are preferably mounted flexibly about 1 cm. apart from each other beneath a block such as block 31 of FIG. 3, the block 32 of FIG. 4 of the block 30 of FIGS. 7 and 8. Since it is customary to make these tests at the three intensities of vacuum, 10 cm., 20 cm. and 30 cm., I may employ a series of three cups 10, 10' and 10'' suspended in a block 31 as shown in FIG. 3. However, in many cases it is desirable to make determinations at higher degrees of vacuum (quite inconvenient or even impossible with conventional instruments), in which case I may conveniently employ five test cups mounted in a block, such as the cups 10, 10', 10'', 10''' and 10'''' suspended beneath a block 32 illustrated in FIG. 4. The conventional test cup has a circular opening 2 cm. in diameter and I may, therefore, use a plurality of cups 10, each as illustrated in FIG. 2. In any event, the cups are suspended about 1 cm. apart on springs 33, freely movable from side to side, so that they may float relatively to the block and so that one cup does not produce tension on the skin sucked into its neighboring cup.

The blocks 31 and 32 may be fashioned from any suitable material and may have any desired dimensions. I prefer to make them from the same transparent thermoplastic acrylic material from which my preferred cups 10 are made. For a three-cup block 31 as in FIG. 3, I have found a ½" x 1½" x 5" block to be satisfactory, with holes 35 large enough to allow the tubing to move freely through them. For a five-cup block 32 as in FIG. 4, the cups 10, 10' etc. may be suspended beneath the block 32 by springs 33, and the block may conveniently be in the form of an isosceles trapezoid with rounded corners.

To provide for multiple simultaneous tests in accordance with this aspect of the invention, cups 10, 10', 10'' etc. are connected as illustrated in FIG. 5 by tubes 11, 11' ... 11'''' and pipes 12, 12' ... 12'''' to individual vacuum pumps 13, 13' ... 13'''' having individual motors 14, 14' ... 14'''', vacuum switches 15, 15' ... 15'''' and check valves 23, 23' ... 23'''', each performing the corresponding function described in relation to FIG. 1 for pump 13, motor 14, switch 15 and valve 23.

As further illustrated in FIG. 5, there is provided a single solenoid valve 19 arranged, upon de-energization of its coil 20, to release the vacuum in all the piping systems 12, 12' ... 12'''' simultaneously, by admitting air into a manifold 26 which is connected as shown to systems 12, 12' ... 12'''' by the respective pipes 18, 18' ... 18''''. To permit different degrees of vacuum to be maintained in each of the systems 12, 12' ... 12'''' (and accordingly in test cups 10, 10' ... 10'''') check valves 27, 27' ... 27'''' are provided, as shown, in lines 18, 18' ... 18''''. Operating in combination, when arranged as shown, check valves 27, 27' ... 27'''' will release the vacuum in each of the systems 12, 12' ... 12'''' upon opening of valve 19 but, when valve 19 is closed, they will prevent transfer of air from one system to another, as for example from pipe 12 through manifold 26 to pipe 12'.

Individual vacuum gages 22, 22′ ... 22′′′′ may advantageously be provided to permit ready observation of the functioning of each system.

Although FIG. 5 (for convenience and clarity in the drawing) shows only three sets of elements, such as the three piping systems 12, 12′ ... 12′′′′, the three pumps 13, 13′ ... 13′′′′, the three switches 15, 15′ ... 15′′′′, etc. connected to the single manifold 26 and suitable for simultaneously maintaining three separate degrees of vacuum in the three test cups 10, 10′ ... 10′′′′ as shown, it is intended that FIG. 5 is to illustrate any desired number of such duplicate sets of elements similarly connected to manifold 26. As stated elsewhere herein, I prefer to use five such sets or units to permit simultaneous tests at five degrees of vacuum, such as at 10, 20, 30, 40 and 50 cm. Hg.

FIG. 6 illustrates a preferred electrical wiring arrangement for the combination apparatus of FIG. 5. A single timer 24 controls current from the electrical source 25 to a bus-wire 40 which, in turn, feeds current to the motor circuits 16, 16′, 16′′, 16′′′, 16′′′′ and to the circuit 41 of the solenoid 20 of the single solenoid valve 19. The circuits are completed by a return bus-wire 42. In circuits 16, 16′, 16′′, 16′′′ and 16′′′′, current to the motors 14, 14′, 14′′, 14′′′ and 14′′′′ (which operate vacuum pumps 13, 13′, etc. as in FIG. 5) is controlled, respectively, by vacuum switches 15, 15′, 15′′, 15′′′ and 15′′′′ in a manner similar to that described in connection with FIG. 1 with respect to the circuit 16, the switch 15 and the motor 14. Advantageously, a pilot light 43 may be connected by a separate circuit 44 between the bus-wires 41 and 42 to indicate operation of the timer 24. There may also be provided various desired accessories such as a hand-operated main switch 45, individual circuit hand switches 46, 46′, etc., and fuses as shown.

Preferably, the timer 24 may be of the type which has a push button 47 to start the timing cycle and which, after a timing cycle is completed, automatically returns to the pre-start "ready" condition. As stated prior, the timer 24 should be capable of timing an interval of one minute with an accuracy of about one second.

It is also convenient to provide a small electric bulb 48, with a flexible cord 49, for aid in inspecting the subject's skin for petechiae after a test. The lamp 48 may be wired to remain "on" while the main switch 45 is "on"; or it may be wired, by suitable connections to the timer 24, so that it will be "on" only when the timer 24 is "off." A wire 50, connecting the timer 24 to the return main 42 may be provided to complete the circuit of the lamp 48 and/or to complete the circuit if the timer 24 is synchronous-motor controlled.

The invention contemplates that the apparatus illustrated in FIGS. 5 and 6 be preferably assembled in a console to form a compact integral instrument, such as the three-unit instrument shown in perspective in FIG. 7 or the five-unit instrument the top panel of which is shown in plan view of FIG. 8, wherein the individual elements are numbered to agree with the corresponding elements of FIG. 5. Although such an instrument may include any desired number of test units within the console, I prefer a five-unit instrument for general adaptability, and particularly for research work, whereby simultaneous tests may be made over a wide range of vacua. However, where weight, size and/or cost are to be considered, the instrument may conveniently contain but three units, although even a single unit instrument is useful within the broader aspects of the invention.

A five-unit instrument may be assembled in a cabinet 16 inches long, 12 inches wide and 17 inches high (not including the space occupied by the cups 10, 10′ etc., the tubing 11, 11′ etc., the electric cord 25, and the handle 52). By using light-weight nylon valves and tubes and an aluminum box, the weight may be about 25 pounds. For a three-unit instrument, the size of the box may be reduced to 11″ x 9″ x 9″ and the weight to about 15 pounds. A one-channel instrument may, of course, be still smaller and lighter. The size and weight of the motors 14 and the vacuum pumps 13 which may be used are of interest. For pumps 13, there are available suitable miniature vane-type, oil-less rotary pumps weighing about 40 ounces complete with a ⅟₂₅ H.P. 6000 r.p.m. motor and coupling, which can produce a 50 cm. Hg vacuum in one second.

If an instantaneous onset of vacuum is required for any research purpose, it can be achieved by insertion of another normally open solenoid valve 53 in the tube 11 of FIG. 1 or just above the block 31 for each cup 10, 10′ etc. (see FIG. 3). The valve 53 is wired parallel with its corresponding electric motor 14, so that the valve 53 is closed when the pump 13 is working and opens when the pump stops. A switch 54 may be used to put the solenoid valve 53 in or out of the motor circuit.

Preparatory to determining a subject's capillary strength with apparatus illustrated in FIGS. 5 to 9, the vacuum switches 15, 15′ etc. are each calibrated against mercury and preset to respond to a separate selected intensity of vacuum (such as, for example, 10 cm., 20 cm., 30 cm., etc.). Using vacuum switches of the type designed for aircraft, the selected series of intensities, once set, will not alter even if the instrument is knocked or jarred, and will remain constant for many months; and it is an important advantage of the apparatus that it can and does remain preset to any selected series negative pressures to ±1 cm. Hg without having to be changed.

With the vacuum switches 15, 15′ etc. preset at the selected series of intensities, and with the timer 24 readied at the selected time interval, a subject's capillary strength may be determined by the simple procedure of applying test cups 10, 10′ etc. to a selected area of the subject's skin and then starting the timer 24 (as by pressing button 47). Activation of the timer 24 causes current to flow to line 40 (FIG. 6) and thence through circuits 41, 44, 16, 16′, etc. closing solenoid valve 19 and starting motors 14, 14′ etc. As each of the pumps 13, 13′ ... 13′′′′ (FIG. 5) evacuate their respective systems 12, 12′ ... 12′′′′ and cups 10, 10′ ... 10′′′′ to the respective settings of switches 15, 15′ ... 15′′′′ each of the latter opens its circuit and thereby shuts off its motor. Each of the check valves 23, 23′ etc. will then maintain its individual vacuum intensity, while check valves 27, 27′ ... 27′′′′ will prevent any higher intensity of vacuum in manifold 26 from increasing the vacuum in any individual system.

Upon completion of the set time interval, the timer 24 will open the circuit to line 40 de-energizing coil 20 and causing valve 19 to open and release the vacua in all the systems. The particular area of the subject's skin is then inspected, either in daylight or with the aid of lamp 48, to determine the presence or absence of petechiae in the portions exposed to each of the cups 10, 10′ etc.

From the foregoing description of the test procedure, it is seen that a person's capillary strength can be determined accurately, rapidly and reproducibly with a single operation of the instrument. As compared to the repeated operations required by prior art instruments, each operation thereof followed by a separate inspection of the patient and a resetting of the apparatus, the single automatic operation provided by my integrated instrument permits testing a series of individuals in a short period of time. This is particularly important in research work requiring comparative tests on a number of individuals, where the overall time saving is significant and where reproducibility with a minimum of human error is imperative. Also, since research work of this nature usually involves volunteer subjects, the ease and rapidity of the test is an important consideration in obtaining volunteers.

Further information concerning capillary strength testing may be obtained from the following publications:

(a) "Capillary Strength and the Menstrual Cycle" by C. Alan B. Clemetson, Lillian Blair and Albert B. Brown;

Annals of the New York Academy of Sciences, vol. 93, Art. 7, pages 277–300;

(b) "Estrogens and Capillary Strength" by C. Alan B. Clemetson, Lillian M. Blair and Dorothy H. Reed; American Journal of Obstetrics and Gynecology, vol. 83, No. 10, pp. 1261–1268 (May 15, 1962);

(c) "Capillary Strength of Women with Menorrhia" by C. Alan B. Clemetson and Lillian M. Blair; Am. J. Obst. and Gynec., vol. 83, pp. 1269–1279.

While the foregoing description sets forth my preferred methods and apparatus, the invention in its broader aspects is not limited thereby, but only by the scope of the appended claims. Many variations and/or equivalents may occur to the worker without departing from the spirit of the invention. For example, though the invention is described by reference to motors 14 operating vacuum pumps 13, suitable electric vacuum pumps (similar in operation to automotive electric fuel pumps) may be used instead. Also, any other suitable electrically operated valve (now known or later developed) may obviously be substituted for the solenoid valve 19 of FIGS. 1, 5, 6 and 9; or, even more broadly, the valve 19 may be operated by mechanical connection to the timer 24. Likewise, though the invention proposes a single timer 24, a plurality of timing means is not thereby excluded. As further examples: the check valve 23 may be replaced by a valve electrically operated by the circuit 16; the "off" and "on" conditions of some of the circuits may be reversed while retaining the desired function; and the order of the electrical elements within each circuit may be reversed, as by passing the current from timer 24 first through motor 14 and then to switch 15, etc.

I claim:

1. Apparatus for clinically producing petechiae under controlled conditions, comprising: a cup having an opening adapted to contact a person's skin, a vacuum piping system connected to said cup by a flexible conduit, a power-driven suction pump for rapidly producing a partial vacuum of predetermined intensity in said system, timing means preset at a predetermined time interval, said pump having means for maintaining said vacuum at said predetermined intensity through said time interval, means for substantially simultaneously starting said pump and initiating said time interval, and means effectuated by said timing means to release said vacuum in said system at the end of said time interval.

2. The apparatus of claim 1 having a check valve in said piping system between said pump and said cup and means providing an adjustable and controllable restriction in said system between said pump and said check valve.

3. Apparatus for clinically producing petechiae under controlled conditions, comprising: a cup having an opening adapted to contact a person's skin, a vacuum piping system connected to said cup by a flexible conduit, a power-driven suction pump for producing a partial vacuum of predetermined intensity in said system, a normally open solenoid valve in said conduit adjacent said cup with its solenoid in series with said pump, timing means preset at a predetermined time interval, said pump having associated means for maintaining said vacuum at said predetermined intensity throughout said time interval, means for simultaneously starting said pump and closing said solenoid valve, means for simultaneously stopping said pump, opening said solenoid valve and initiating said time interval to cause immediate action of vacuum at said cup, and means effectuated by said timing means to release said vacuum in said system at the end of said time interval.

4. Apparatus for artificially producing petechiae under controlled conditions in the determination of a subject's capillary strength, comprising: a hollow test member having an opening of predetermined size for application to a subject's skin, a vacuum system including flexible tubing providing fluid connection to said member, an electric motor, a suction pump driven by said motor and connected to said system so as to rapidly evacuate said system when said motor is operating, check means in said system for preventing air from entering said system through said pump when said pump is idle, timing means adapted to actuate said motor at the start of a predetermined time interval, vacuum-control means overriding said timing means adapted to deactivate said motor at a predetermined degree of vacuum in said system, and means controlled by said timing means to release the vacuum in said system at the completion of said time interval.

5. The apparatus of claim 4 having restriction means in said system between said pump and said check means for preventing overshooting of the vacuum.

6. Apparatus for clinically producing petechiae under controlled conditions, including: a test cup, a vacuum piping system flexibly connected thereto, a suction pump connected to said system through a check valve, an electric motor driving said pump, an electrical valve arranged to admit air into said system when open, a timer arranged to simultaneously close said electrical valve and to activate said motor throughout a preset timing cycle, a vacuum controlled switch overriding said timer to open the circuit of said motor to stop said motor at a given degree of vacuum in said system, and means for maintaining the vacuum at said given degree for the interval set on said timer.

7. The apparatus of claim 6 having adjustable restriction means in said system between said check valve and said pump.

8. Apparatus for simultaneously testing a patient's skin for resistance to petechiae induced at a plurality of intensities of vacuum, comprising: a plurality of cups, each having an opening adapted to contact adjacent areas of a person's skin, a respective vacuum piping system for each cup and connected thereto by a separate flexible conduit, each such system comprising a power driven suction pump adapted to produce rapidly a partial vacuum of predetermined intensity in its respective system, timing means adapted to actuate all said pumps at the start of a predetermined timing cycle, and means effectuated by said timing means to release the vacua in all of the systems at the completion of said timing cycle.

9. The apparatus of claim 8 wherein said cups are resiliently supported by a common support member and are spaced apart from each other.

10. Apparatus for simultaneously producing a plurality of degrees of vacuum on separate areas of a subject's skin, comprising: a plurality of test units, each including respectively a hollow test member having an opening of predetermined size for application to a subject's skin, a vacuum system in flexible communication therewith, a suction pump adapted to rapidly evacuate its respective system when operating, a motor driving said pump, means for preventing air from entering the system through said pump when idle, and a vacuum control means for causing operation of said motor only when the vacuum intensity in its particular system is below a value separately fixed for each said system; a unitary timing means for starting all said motors at the beginning of a predetermined timing cycle, and means controlled by said timing means to release the vacua in all said units upon completion of said cycle.

11. The apparatus of claim 10 including a single support means for all said hollow test members and a plurality of spring mounting means for yieldingly mounting each said hollow test member to said support means.

12. The apparatus of claim 11 wherein each said test member is spaced at least 1 cm. from each other test member.

13. An instrument adapted to be mounted in a console for simultaneous multiple tests on a subject and including a series of test units, each unit individually comprising a separate test cup and a piping system having a flexible connection to its said test cup, a suction pump connected thereto through a no-return check valve, an electric motor driving said pump, and a vacuum-controlled switch adapted to open the circuit of the corresponding motor at an intensity of vacuum separately preset for each unit; all said systems being connected through separate check valves to an electrical valve adapted, when not energized, to open and release the vacua in all the systems; and a unitary timing means adapted, for the duration of a set timing cycle, to supply current to said electric valve and to the vacuum-switch-controlled circuit of each of said motors.

References Cited by the Examiner

UNITED STATES PATENTS

| | | | |
|---|---|---|---|
| 2,591,443 | 4/1952 | Larson et al. | 128—2 |
| 2,855,920 | 10/1958 | Parrot | 128—2 |
| 3,003,496 | 10/1961 | Klein | 128—2 |

RICHARD A. GAUDET, *Primary Examiner.*

SIMON BRODER, *Examiner.*